A. S. McALLISTER.
ALTERNATING CURRENT MOTOR.
APPLICATION FILED OCT. 26, 1909.
1,066,831. Patented July 8, 1913.
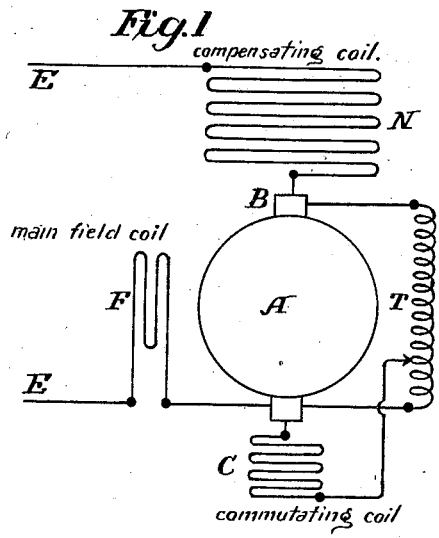
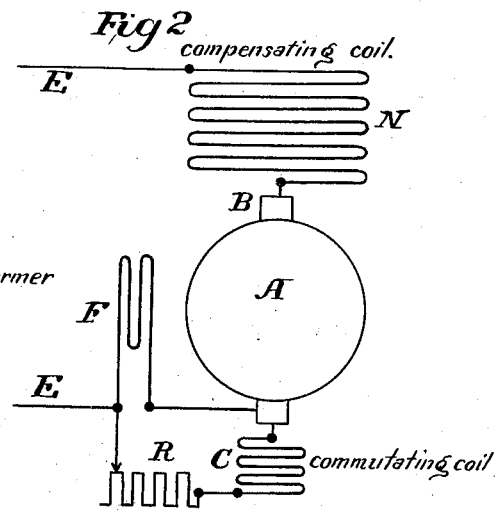
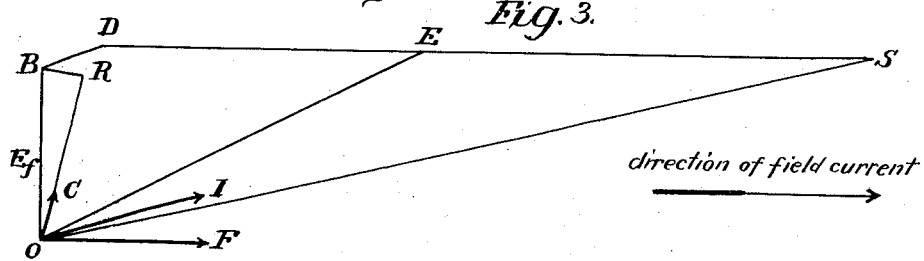
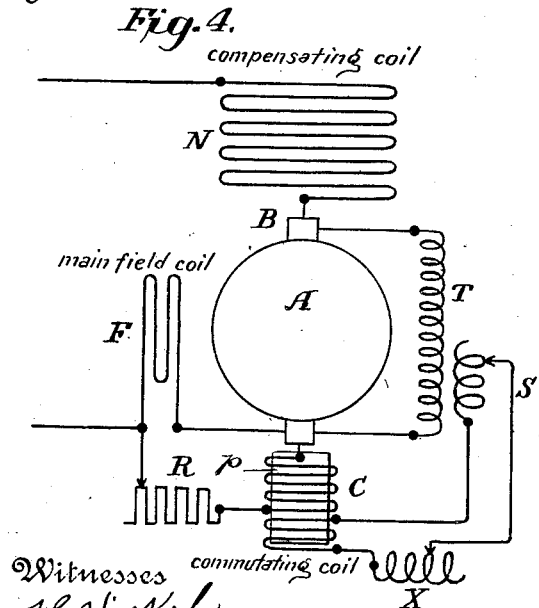
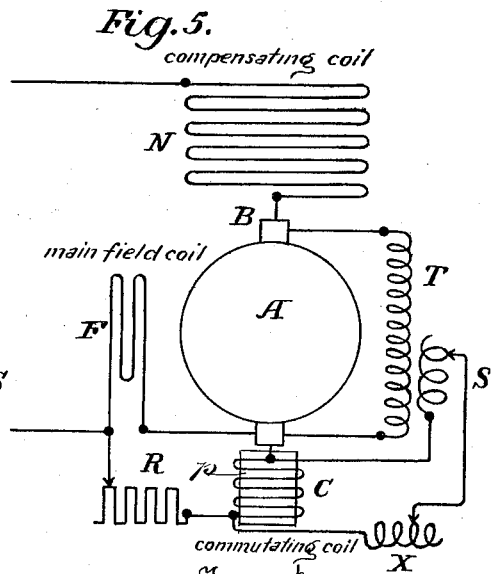
Witnesses
J. G. Finkel
Charles N. Murray.
Inventor
Addams S. McAllister
by Eugene C. Brown
Attorney

UNITED STATES PATENT OFFICE.

ADDAMS S. McALLISTER, OF NEW YORK, N. Y.

ALTERNATING-CURRENT MOTOR.

1,066,831.

Specification of Letters Patent.

Patented July 8, 1913.

Application filed October 26, 1909. Serial No. 524,634.

*To all whom it may concern:*

Be it known that I, ADDAMS S. MCALLISTER, a citizen of the United States, residing at New York, in the county of New York and State of New York, have invented new and useful Improvements in Alternating-Current Motors, of which the following is a specification.

My invention relates to alternating current motors of the commutator type, in which an auxiliary commutating field is provided for the purpose of neutralizing or balancing the electromotive forces induced in the armature coils short-circuited by the brushes.

The object of my invention is to produce a high power-factor, non-sparking, single-phase commutator motor, and which will maintain these characteristics throughout a wide range of speed.

The greatest difficulties which arise in the operation of alternating-current commutator motors are due to their inherently low power-factor and the destructive sparking at the commutator brushes. Among the methods that have been devised for increasing the power-factor of series motors, the most popular has proved to be the one by which the lagging wattless component of the voltage is decreased by compensating the armature magnetomotive force. With perfect compensation or nullification of the armature magnetism, the only reactance of the motor circuits would be that due to the alternation of the main field flux through the field coils. By the use of a low value of flux produced by a few circuit turns per pole, the power-factor can be made to assume a satisfactorily high value when the speed is such as to produce a relatively large counter electromotive-force across the armature. It is evident, therefore, that the disadvantageous conditions with reference to the lower power-factor of single-phase motors can be easily overcome. The other characteristic referred to relating to the difficulties in the commutation encountered in the operation of alternating-current series motors, and which cause vicious sparking and destruction of the commutator will now be dealt with in describing my present invention which involves a method of overcoming these difficulties and producing a single-phase commutator motor which will operate without sparking and at a very high power-factor throughout a considerable range of speed.

An examination of the circuits of a single-phase motor of the commutator type will show that the coil which is spanned by the commutator brush is the seat of an electromotive force generated by the fluctuations in the value of the main field magnetism which it surrounds, so that there is produced in the short-circuited coil by transformer action a voltage ninety degrees out of phase with the motor current. This E. M. F. short-circuited by the brush has a value which depends upon the product of the number of turns in the coil under the brush, the value of the field flux and the value of the main circuit frequency. It can be reduced to a fairly low value by using only one armature turn between adjacent commutator segments, utilizing a small value of field flux, and operating the machine at a low circuit frequency. However, even under the most advantageous conditions the E. M. F. has a value sufficient to produce destructive sparking unless means are employed to minimize its effect. In order to counterbalance this voltage in the short-circuited coils, a commutating field is required, which is ninety degrees out of phase with the motor currents or in time-quadrature to the main field flux so that the speed-generated E. M. F. in the coil under the brush due to rotation in this commutating field is in time-phase (opposition) with the E. M. F. generated in the same coil by the transformer action of the main field flux. Now, since the current in the commutating coils lags nearly ninety degrees behind the voltage impressed upon their terminals, a simple shunt connection impressing a voltage thereon in phase with the motor currents would produce the proper commutating flux, but the field would remain substantially constant and consequently the E. M. F. generated in the short-circuited armature coils would increase with the speed. On the other hand, the electromotive forces induced by transformer action in the short-circuited coils is independent of the speed, and varies with the current, which tends to decrease as the motor speed increases. Consequently, a simple shunt connection with the commutating coils can give good commutation for only one speed. The E. M. F. on the commutating pole coils should be caused to vary directly with the value of the main field flux and inversely with the speed of rotation. By my present invention the flux in the commutating pole is in time-quadrature with the main field flux and has a value which varies inversely with the armature speed.

My invention will best be understood by reference to the accompanying drawings, in which—

Figure 1 shows diagrammatically the electric circuits of a compensated series motor with shunt-connected commutating-pole windings; Fig. 2 shows another arrangement of the shunt-connections for the commutating-pole coils with provision for increasing the power-factor of the motor; Fig. 3 is a vector diagram explanatory of the motor illustrated in Fig. 2; Figs. 4 and 5 show diagrammatically different circuit arrangements of compensated series motors with commutating-pole windings embodying my invention.

In the drawings, A represents the armature, B the commutator brushes, C the commutating coil or coils, F the main field coil, and N the compensating coil or coils.

In Fig. 1, I have shown a means for impressing upon the commutating-pole coil C, an E. M. F. in time-phase with the E. M. F. across the armature brushes, which consists of an auto-transformer connected to the brushes, one terminal of the commutating coil being connected to one brush and the other terminal being adjustably connected to the auto-transformer coils. Under speed conditions of the motor, the E. M. F. thus impressed upon the commutating coil will be in time-phase with the main field flux, and hence is in time-quadrature with the electromotive force produced by the transformer action of the main field flux in the coil short-circuited by the brush; and the flux in the commutating pole is thus in time quadrature to the main field flux. It is apparent, therefore, that the speed-generated E. M. F. in the coil under the brush is in time-phase (opposition) with the E. M. F. generated in the same coil by the transformer action of the main field flux, and by making the opposing E. M. F. equal to the active E. M. F. in the same coil, the resultant E. M. F. reduces to zero, thus eliminating the main cause for sparking. For a certain value of the main field flux, the transformer E. M. F. in the coil under the brush is independent of the speed, while the amount of flux required in the commutating poles should vary inversely with the speed in order to produce by speed action an E. M. F. equal and opposite to this E. M. F. It is evident that the electromotive force on the commutating-pole coils should be caused to vary directly with the value of the main field flux and inversely with the speed of rotation, and this condition can be readily obtained by adjustment of the connection with the auto-transformer.

As above indicated, it is necessary to vary the voltage impressed upon the commutating coil with the change in speed of the rotor or armature of the machine, in order to give to the commutating flux the proper value at each speed. It has been proposed to make this action automatic by connecting a non-inductive resistance in series with the main field coils and to connect the commutating coils in shunt to this resistance and in circuit with a source of voltage which varies in proportion to the voltage across the commutator brushes, thus securing a resultant of two electromotive forces upon the commutating coil, one of which varies directly with the main armature current and the other with the rotor speed.

In Fig. 2, I have shown a method of obtaining the proper phase position of the E. M. F. on the commutating coil and simultaneously improving the power factor of the machine. The non-inductive resistance R, instead of being in series with the main field coil F, is in shunt thereto and receives only the current passing through the commutating coil. The manner in which this arrangement operates to affect the motor circuits will be better understood by reference to the diagram of phase relations shown in Fig. 3. The line O F represents the constant value and phase position of an assumed one ampere of field current. O B shows the electromotive force E$f$ impressed across the main field coils. It is evident that this E. M. F. is also impressed across the circuit including the commutating coil C, and the resistance R in series therewith. The component electromotive forces in this circuit are B R, representing the E. M. F. across the commutating coil, and O R the E. M. F. across the resistance, the two being in time-quadrature. The current through this shunt circuit is shown by O C, in time-phase with O R. The current flowing through the armature A, is the resultant of the currents through the field coil F and the shunt through the commutating coil, and is therefore the vector sum of O F and O C, represented by O I. The voltage consumed in the resistance of the armature A and compensating coil N, is represented by B D. Now under speed conditions there is generated at the brushes of the armature, an electromotive force in time-quadrature with O B, and which is represented by D E, for a certain chosen value of speed. At this speed, therefore, the total impressed electromotive force is O E, the angle E O I being the angle of lag of the current behind the electromotive force of the machine. From the diagram it will appear that when the speed has reached a sufficiently high value, as for instance, when the speed E. M. F. is D S, the electromotive force will lag behind the current, and the current will then have a leading quadrature wattless component which will have a condenser effect upon the motor circuits. Under all speed conditions, the angle of lag is reduced by the angle F O I, and the power-factor is improved thereby. It is possible to increase the value of O C provided the value of B R is decreased. It is apparent, therefore, that it is impracticable to cause the current O C to be exactly in time-quadrature with O F by reason of the large amount of power that would be dissipated in the shunting resistance R, so that the arrangement shown in Fig. 2, does not give perfect power-factor conditions—although the power-factor may even be unity—and does not produce exactly perfect neutralization conditions. However, to the extent that the angle of the current is not correct for giving the maximum power-factor effect, it is correct for increasing the torque, and to the extent that the field flux does not neutralize the transformer E. M. F., it tends to compensate for the reactive E. M. F. in the coil under commutation. Thus all of its actions are advantageous.

To render my method of producing a high power-factor, non-sparking motor disclosed herein, automatic in its action, I have devised an arrangement of motor circuits shown in Figs. 4 and 5, by which there is impressed upon the commutating pole a magneto-motive force which varies directly with the field current and an opposing magnetomotive force which varies directly with the speed. The commutating pole flux which is produced by the resultant of these two magnetomotive forces, has a certain definite value at standstill and decreases at a constant rate with increase of the motor speed. In Fig. 4, I have shown two coils, or it might be two separate portions of a coil, upon the commutating flux core P, each coil being connected in a separate circuit; one coil in circuit with the non-inductive resistance R, and the other coil in circuit with the secondary coil S of the transformer T, and having in series therewith the inductive resistance or reactance X. It is not necessary, however, to employ two separate coils, and in Fig. 5 I have shown the terminals of the coil C connected to the two separate circuits, the term "coil" in the claims being intended to cover either arrangement or any equivalent arrangement of windings which would be within the spirit of my invention. The current in shunt circuit through the commutating coil and the resistance R impresses a magnetomotive force upon the commutating pole which varies directly with the field current, and, as explained above in connection with Figs. 2 and 3, the phase relation of this current is such that it increases the power factor of the current taken by the motor. The magnetomotive force thus impressed upon the commutating pole is modified by an opposing magnetomotive force which varies directly with the speed by reason of the connection of the coil C with the secondary coil S of the transformer T, the primary of which is connected across the commutator brushes. By reason of the reactance X, included in series with the secondary coil S, each value of the electromotive force in this circuit tends to produce a certain definite amount of current therein, so that the magnetomotive force impressed upon the commutating core thereby, rather than the flux produced in this core, depends upon the voltage of the secondary S, whereas if the series reactance were omitted the flux produced by the coil due to the transformer would have a definite value for each value of the E. M. F. produced by the transformer, quite independent of all other conditions. From the above it is clear that the commutating flux, in the arrangement shown in Figs. 4 and 5, is the resultant of two magnetomotive forces, each magnetomotive force being produced by a separate and independent voltage. Each component magnetomotive force independently maintains its proper value, so that the resultant magnetomotive force produces a commutating flux automatically varying with the speed and bearing the required relation to the electromotive forces induced in the armature coils short-circuited by the brushes, so that the motor will operate without sparking and at the same time maintain a high power-factor.

I do not desire to limit myself to the particular constructions shown, but aim in the appended claims to cover all modifications which will readily occur to those skilled in the art and which are within the scope of my invention.

Having described my invention, what I claim as new and desire to secure by Letters Patent is—

1. In an alternating-current motor of the commutator type, a commutating flux core and a coil thereon, means connecting said coil in shunt to the main field windings for impressing on the commutating core a magnetomotive force varying with the value of the main field flux, and means also connected with said coil for impressing on said core a magnetomotive force varying in proportion to the armature voltage.

2. In an alternating-current motor of the commutator type, main field windings, a commutating flux core, and means included in a plurality of circuits for producing on said core opposing magnetomotive forces giving rise to a resultant flux, one of said circuits being in shunt to the main field windings.

3. In an alternating-current motor of the commutator type, a main field coil a compensating coil, a commutating coil connected in shunt to said field coil, and a transformer having its primary connected to the armature terminals and its secondary connected by suitable conductors to said compensating coil, a reactance device being connected in the circuit of said conductors.

4. In an alternating-current motor of the commutator type, a main field coil, a commutating flux core, and means for subjecting said core to a magnetomotive force which is the resultant of two magnetomotive forces, the one being substantially proportional to the armature current and the other proportional to the armature electromotive force, said means including a resistance in shunt to the main field coil, whereby the power factor of the motor circuit is increased.

5. In an alternating-current motor of the commutator type, a commutating flux core and a coil thereon, and means for subjecting said core to a magnetomotive force substantially proportional to the voltage between the commutator brushes, said means including a reactance in circuit with said coil.

6. In an alternating-current motor of the commutator type, a main field coil, a circuit containing a resistance in shunt therewith, a commutating flux core having a coil thereon in series with said resistance, and means for producing in said coil a current-component varying with the armature electromotive force.

7. In an alternating-current motor of the commutator type, a main field coil, a circuit containing a resistance in shunt therewith, a commutating flux core, a coil on said core in circuit with said resistance for producing a commutating flux therein, and means coöperating with said coil for impressing upon said core a magnetomotive force for altering its value substantially in proportion to the armature voltage.

8. In an alternating-current motor of the commutator type, a main series field coil, a magnetic core in position to carry a flux for improving the commutation, and means for impressing upon this core the resultant of two opposed magnetomotive forces substantially in quadrature with the main field flux, one of which varies with the armature current and the other with the armature electromotive force.

9. In an alternating-current motor of the commutator type, a main field coil, a magnetic core in position to carry a flux for improving the commutation, and means for impressing upon this core the resultant difference between two magnetomotive forces, one of which varies with the field current and the other with the voltage across the armature terminals, and each in substantial quadrature with the main field flux.

10. In an alternating-current motor of the commutator type, a commutating-flux core, and means for impressing upon said core a magnetomotive force varying with the armature voltage, said means comprising a highly inductive impedance, a coil on the core in series therewith, and a device for subjecting said coil and said impedance to an electromotive force varying with the armature voltage.

11. In an alternating current motor of the commutator type, a main series field coil, a commutating-flux core, and means for producing a magnetomotive force in said core comprising a circuit in shunt to said series field coil connected to the outer field terminal and to one armature terminal, said circuit including a coil on said core and a resistance sufficient to cause a leading current in the motor circuit.

In testimony whereof I have hereunto set my hand in presence of two subscribing witnesses.

ADDAMS S. McALLISTER.

Witnesses:
W<small>M</small>. H. O<small>NKEN</small>, Jr.,
W. W. W<small>EAVER</small>.